United States Patent [19]
Aaron

[11] Patent Number: 5,188,464
[45] Date of Patent: Feb. 23, 1993

[54] HAND-HELD BAR CODE PRINTER FOR ENVELOPES AND LABELS

[76] Inventor: Nancy A. Aaron, 3345 Pursell La., Pensacola, Fla. 32526

[21] Appl. No.: 804,988

[22] Filed: Dec. 10, 1991

[51] Int. Cl.$^5$ ............................................. B41J 5/00
[52] U.S. Cl. ...................................... 400/103; 400/88; 400/120; 400/23; 235/462; 346/76 PH
[58] Field of Search ............... 400/120, 88, 103, 104, 400/123, 130, 23, 56, 58; 177/4; 235/462; 346/9, 76 PH

[56] References Cited

U.S. PATENT DOCUMENTS

| | | | |
|---|---|---|---|
| 3,490,365 | 10/1967 | Roche | 101/292 |
| 3,828,664 | 8/1974 | Dikoff | 400/23 |
| 3,923,135 | 12/1975 | Holman et al. | 400/23 |
| 4,168,533 | 9/1979 | Schwartz | 400/88 |
| 4,440,248 | 4/1984 | Teraoka | 235/462 |
| 4,623,418 | 11/1986 | Gombrich et al. | 400/88 |
| 4,660,221 | 4/1987 | Dlugos | 400/104 |
| 4,674,056 | 6/1987 | Goodfellow | 400/88 |
| 4,706,096 | 11/1987 | Sato | 400/103 |
| 4,734,710 | 3/1988 | Sato et al. | 101/93.04 |
| 4,742,771 | 5/1988 | Heilig | 101/327 |
| 4,746,932 | 5/1988 | Sato | 400/103 |
| 4,757,329 | 7/1988 | Sato et al. | 400/103 |
| 4,868,757 | 9/1989 | Gil | 177/25.15 |
| 4,900,905 | 2/1990 | Pusic | 235/381 |
| 4,904,330 | 2/1990 | Vanderpool et al. | 101/93.04 |
| 5,032,030 | 7/1991 | Russbult | 400/88 |
| 5,056,429 | 10/1991 | Horosaki | 400/103 |
| 5,063,451 | 11/1991 | Yanagisawa et al. | 400/88 |
| 5,080,509 | 1/1992 | Stone | 400/23 |

FOREIGN PATENT DOCUMENTS

| | | | |
|---|---|---|---|
| 0010472 | 2/1981 | Japan | 400/88 |
| 0093174 | 6/1982 | Japan | 400/88 |
| 0011187 | 1/1983 | Japan | 400/103 |
| 0232886 | 12/1984 | Japan | 400/58 |
| 0129278 | 7/1988 | Japan | 400/103 |

OTHER PUBLICATIONS

"Print Head Engagement & Ribbon Grounding Mechanism" IBM Tech. Discl. Bulletin, vol. 27, No. 4A, Sep. 1984 pp. 1868-1869.
"Thermal Print Head Control" IBM Tech. Discl. Bulletin vol. 21, No. 4, Sep. 1978 pp. 1594-1595.
"Alphanumeric Bar Code" IBM Tech. Discl. Bulletin, vol. 22, No. 8B, V80 pp. 3527-3529.

Primary Examiner—Eugene H. Eickholt
Attorney, Agent, or Firm—Wegner, Cantor, Mueller & Player

[57] ABSTRACT

A pocket sized, electric powered bar code printer has a slot for receiving an envelope or label, interchangeably. The slot and an end stop thereof are situated so as to enable the user to easily locate the label or the lower left corner of the envelope relative to a mechanical and/or thermographic printer which is used to impart thereto the bar code used by the U.S. Post Office. A numeric keypad allows the desired postal zip code to be input to the device, and these numbers are displayed on an LCD screen, as they are entered, for review by the user prior to printing. A "clear entry" key allows the user to make needed corrections, after which depression of a "print" key initiates printing of a bar code which corresponds to the entered numbers. As long as the power is not interrupted and there is no change to the display, subsequent pieces of mail may be printed with the same code by just depressing the print key once the items are properly located in the slot.

10 Claims, 1 Drawing Sheet

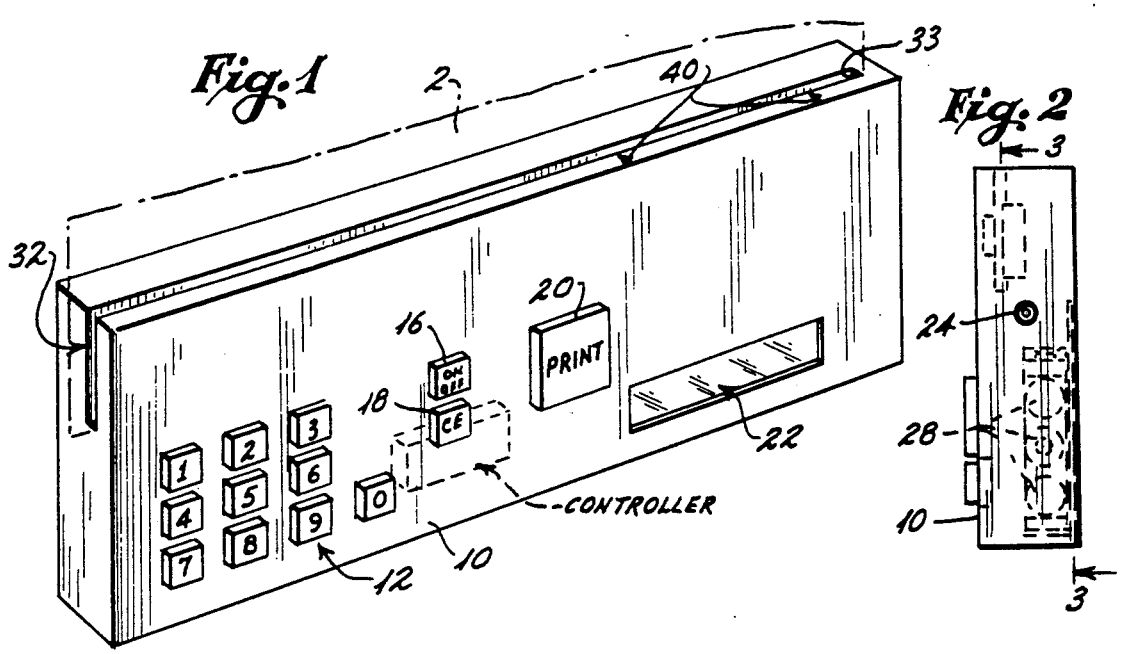
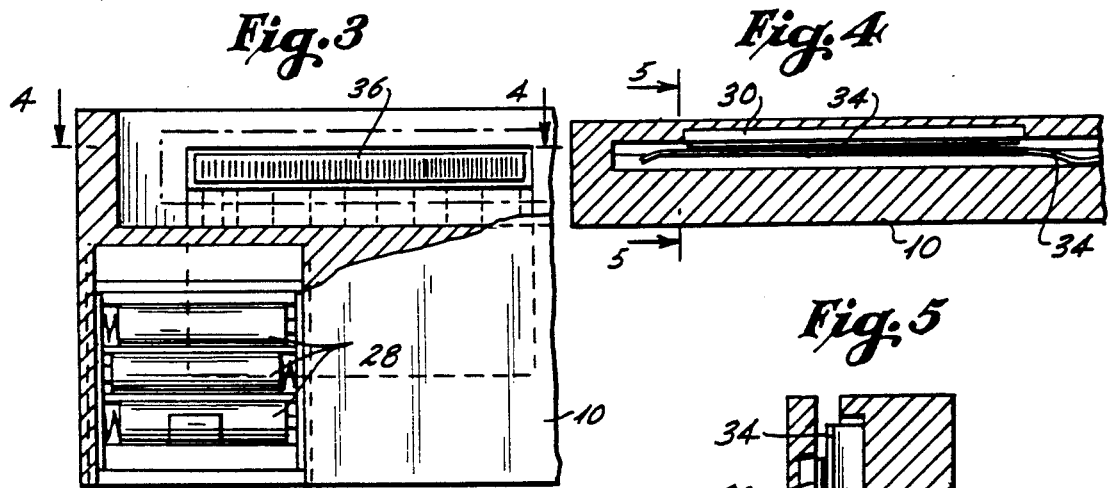
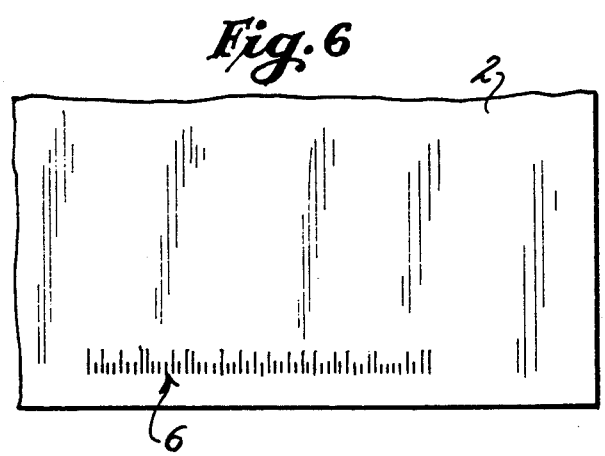
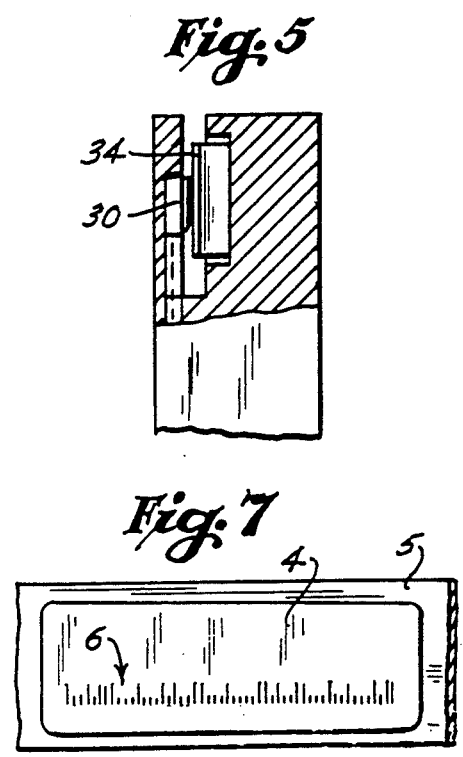

HAND-HELD BAR CODE PRINTER FOR ENVELOPES AND LABELS

PRIOR ART CROSS REFERENCES

U.S. Pat. No. 3,490,365 to ROCHE entitled PORTABLE TICKET PRINTER issued Oct. 18, 1967.

U.S. Pat. No. 4,440,248 to TERAOKA entitled BAR CODE PRINTER issued Apr. 3, 1984.

U.S. Pat. No. 4,660,221 to DLUGOS entitled SYSTEM FOR PRINTING ENCRYPTED MESSAGES WITH BAR-CODE REPRESENTATION issued Apr. 21, 1987.

U.S. Pat. No. 4,734,710 to SATO et al. entitled THERMAL LABEL PRINTER issued Mar. 29, 1988.

U.S. Pat. No. 4,742,771 to HEILIG entitled POSTAL CODE ENVELOPE PRINTER issue May 10, 1988.

U.S. Pat. No. 4,746,932 to SATO entitled THERMAL LABEL PRINTER HAVING I/O CAPABILITIES issued May 24, 1988.

U.S. Pat. No. 4,868,757 to GIL entitled COMPUTERIZED INTEGRATED ELECTRONIC MAILING/ADDRESSING APPARATUS issued Sep. 19, 1989.

U.S. Pat. No. 4,900,905 to PUSIC entitled AUTOMATED MAIL COLLECTING AND TELECOMMUNICATION MACHINE issued Feb. 13, 1990.

U.S. Pat. No. 4,904,330 to VANDERPOOL et al. entitled HAND-HELD LABELER HAVING IMPROVED WEB POSITION SENSING AND PRINT HEAD CONTROL issued Feb. 27, 1990.

BACKGROUND AND SUMMARY OF THE INVENTION

The present invention relates to a device by which envelopes and labels may be marked in order to facilitate mechanical sorting by the postal service. More specifically, it deals with an economical, hand held device by which zip codes or the like may be printed onto articles of mail, in the location on each article and in the code stipulated by the U.S. Post Office for sorting of the mail by mechanical devices.

The U.S. Postal Service will handle bar coded mail significantly faster and less expensively than that which is not provided with bar coding. For instance, at the present time, a first class letter weighing an ounce or less is processed at a cost of 25 cents when bar coded. By comparing this with a cost of 29 cents for the same letter without bar coding, and with the sometimes more important fact that delivery of the uncoded letter in the U.S. typically takes 7-10 days, one can appreciate the need for an inexpensive device that the individual and small business can use to obtain timely delivery of their while minimizing costs.

Businesses with large volume mailings typically provide a room or other area dedicated to mail handling with one or more machines which can feed, weigh, stamp, and print bar coding on their mail. Needless to say, the size and expense of these types of machines are not space or cost effective for the low volume mailer such as the small business or individual. What is needed for such low volume mailers is a small, preferably hand held, device by which the user can manually enter the zip code to be printed on the envelope or label, visually check the entered data and correct the entry when needed, and actuate printing of the corresponding bar code onto the article of mail in the appropriate location and manner.

Thus, it is an object of the invention to provide an economical, hand held printer which is particularly suitable for use in meeting the needs of the small business and/or individual as described above. Other objects of the invention will become apparent to the reader from the remainder of the written disclosure and drawings.

BRIEF SUMMARY OF THE INVENTION

A pocket sized, electric powered bar code printer has a slot for receiving an envelope or label, interchangeably. The slot and an end stop thereof are situated so as to enable the user to easily locate the label, or the lower left corner of the envelope, relative to a mechanical and/or thermographic printer which is used to impart thereto the bar code used by the U.S. Post Office. A numeric keypad allows the desired postal zip code to be input to the device, and these numbers are displayed on an LCD screen, as they are entered, for review by the user prior to printing. A "clear entry" key allows the user to make needed corrections prior to actuation of a "print" key to initiate printing of a bar code which corresponds to the entered numbers. As long as the power is not interrupted and there is no change to the display, subsequent pieces of mail may be printed with the same bar code by just depressing the print key for each item when it is properly located in the slot.

BRIEF DESCRIPTION OF THE DRAWINGS

FIG. 1 is a perspective view of the device of the invention.

FIG. 2 is a right end elevational view of the device of FIG. 1.

FIG. 3 is a partial rear elevation, as viewed generally in the direction of the arrows 3—3 in FIG. 2.

FIG. 4 is a top plan view of the device of FIG. 3, as generally viewed in the direction of arrows 4—4 in FIG. 3.

FIG. 5 is a partial cross-section, as viewed generally in the direction of arrows 5—5 in FIG. 4.

FIG. 6 is a partial front elevation of a letter which has been bar code printed by means of the inventive device.

FIG. 7 is an elevational view of a label which has been bar code printed by means of the inventive device.

DETAILED DESCRIPTION OF THE INVENTION

Referring to the FIG. 1, the case 10 of the hand held bar coding device of the invention includes an on/off key 16 and a keypad 12 for numerical entry of the zip code or the like. As the numbers of the zip code are entered into the device via the keypad 12, they are displayed on a liquid crystal diode (LCD) screen 22. A "clear entry" key 18 is provided in order to correct an numbers which are entered incorrectly, as may be identified by looking at the display screen 22. Upon verifying correct entry of the zip code, by referring to the display screen 22, a print key 20 may be depressed in order to initiate printing of the bar code corresponding to that entry.

The device includes a printing module 30 having a series of printing elements 36, as indicated in FIG. 3. Preferably, printing module 30 is a mechanical type utilizing a print ribbon cartridge or the like. Printing module 30 may have the additional or alternative capability for printing thermographically on a special thermographic medium such as individual labels which are attachable to the article of mail prior, or subsequently, to printing of the bar code thereon. A bar code 6 which is printed on an envelope 2 is illustrated in FIG. 6; and FIG. 7 illustrates the bar code 6 printed on a label 4 which is removable from the typical backing strip 5.

A slot 32 is provided in the case 10 for reception and guiding of an article of mail, such as the letter 2 which is partially shown in FIG. 1. A stop surface 33 is provided at one end of slot 32 and is positioned relative to the printing elements 36 so as to ensure that the bar coding to be printed on the envelope will be located on that portion of the envelope which has been specified by the U.S. Postal Service. When printing a label 4, which is usually attached to some form of backing 5, proper positioning of the label length-wise relative to the printing elements 36 may be aided by provision of arrows or other forms of indicia 40 as seen in FIG. 1.

Slot 32 is sufficiently wide to accept articles of mailing of various thicknesses, and a leaf spring 34 is situated on the opposite side of slot 32 from the printing elements 36 (as see in FIGS. 4 and 5) in order to ensure good contact of the printing elements 36 with the article 2.

Power may be supplied to the device via a power cord (not shown) attached to receptacle 24 (FIG. 2) or by batteries 28 (FIG. 3). It is also contemplated that circuitry could be provided to recharge the batteries 28 automatically via the power cord in any well known manner.

The controller may be a microprocessor capable of receiving and converting the numerical entries at the keyboard 12, once print key 20 has been actuated, into output signals which are sufficient to enable printing elements of printing module 30 for printing the bar code corresponding to the numerical entries. Further, as long as there is no interruption of power, reprinting of a particular entry may be repeated again and again, without change, by just pressing the print key 20 for each article of mail that is inserted into the slot 32.

It also is preferred that the controller provides for printing the bar code representing a zero for each number of the zip code which is not entered by the user. For instance, when the user only enters the first five numbers of the zip code, the missing four numbers which would complete the zip code are accounted for by automatically providing zeroes in place thereof. Also, it is preferable that opening and closing bars are printed automatically for each printing of a bar coded zip code.

It is considered to be well within the concept of the invention to use any type of bar code printing module which is capable of accomplishing the objectives described herein, and it is considered to be within the capabilities of the artisan to adapt such other printing modules for use in the device of this invention.

For instance, for thermographic printing, each printing element 36 may comprise two resistive heating elements arranged end-to-end and selectively energizable so that energization of both heating elements of each printing element will impart a long bar to the article being printed, while energization of only one of the end to end heating elements of each printing element (specifically, the lower heating element) will result in the small bar of the bar code being imparted to the article during printing. The above cross-referenced U.S. Pat. No. 4,904,330 discloses a thermographic printer of the sort described herein and electronic circuitry by which it may be operated in the manner described herein.

Thus, it will be seen that the objects set forth above, among those made apparent from the preceding description, are efficiently attained and since certain changes may be made in the construction set forth without departing from the scope of the invention, it is intended that all matter contained in the above description or shown in the accompanying drawings shall be interpreted as illustrative and not in a limiting sense.

It is to be understood also that the following claims are intended to cover all of the generic and specific features of the invention herein described, and all statements of the scope of the invention which, as a matter of language, might be said to fall therebetween.

Now that the invention has been described, I claim:

1. A hand held device for printing selectively different numerical zip codes or the like on articles of mail in a bar code corresponding to numbers of said zip code and comprising:
   a case having a power supply, a bar code printing module, a display module, a keypad module, and controller means for communicating with and controlling said modules in accordance with a set of instructions;
   said keypad module comprising a power switch means for selectively energizing said device, key means for entering numbers of said zip code into said device selectively, and means for initiating printing of said bar code;
   said display module having means for displaying each number of said zip code as said numbers are entered into the device viz said key means;
   said printing module having means for printing said bar code upon actuation of said printing initiating means; and
   said case having means for receiving envelopes and labels, individually and interchangeably, as said articles of mail and for guiding said articles to a print station, said article receiving and guiding means comprising a slot in said case with said printing elements situated adjacent to and in communication with said slot and near one end of said slot, and means for locating a specific portion of each of said articles in relation to said printing means so as to ensure that said bar coded zip code is printed on said specific portion of each said article, said means for locating said articles comprising, at said one end of said slot, first stop means for abutting a first edge of said article of mail and second stop means for abutting a second edge of said article which is generally perpendicular to said first edge.

2. A device as in claim 1, wherein said controller means comprises:
   a microprocessor having means for receiving and converting numerical entries from said key means into output signals sufficient to enable printing elements of said printing module for printing of said bar code corresponding to said numerical entries upon actuation of said printing initiating means.

3. A device as in claim 1, wherein said bar code printing module comprises:
   a thermographic printer with said printing elements being an array of selectively energizable resistive heating elements.

4. A device as in claim 1, wherein said display means comprises:
   a liquid crystal display screen.

5. A device as in claim 1, wherein said keypad module further comprises:
   means for clearing numerical entries, which were entered by actuation of said key means, prior to actuation of said printing initiating means.

6. A device as in claim 1, and further comprising:
   leaf spring means, situated at said print station, for urging a portion of said article of mail against one side of said slot at said printer station in order to ensure an acceptable printing of said bar code on said portion.

7. A device as in claim 1, wherein said device is battery powered.

8. A device as in claim 1, wherein said locating means comprises:
   indicia on said case and visible to a user when positioning each said article of mail for printing.

9. A hand held device for printing selectively different numerical zip codes or the like on articles of mail in a bar code corresponding to numbers of said zip code and comprising:
   a case having a power supply, a bar code printing module, a display module, a keypad module, and controller means for communicating with and controlling said modules in accordance with a set of instructions;
   said keypad module comprising a power switch means for selectively energizing said device, key means for entering numbers of said zip code into said device selectively, and means for initiating printing of said bar code;
   said display module having means for displaying each number of said zip code as said numbers are entered into the device via said key means;
   said printing module having means for printing said bar code upon actuation of said printing initiating means;
   said case having means for receiving envelopes and labels, individually and interchangeably, as said articles of mail and for guiding said articles to a print station, and means for locating a specific portion of each of said articles in relation to said printing means so as to ensure that said bar coded zip code is printed on said specific portion of each said articles; and
   means for printing opening and closing bars automatically with actuation of said printing initiating means.

10. A hand held device for printing selectively different numerical zip codes or the like on articles of mail in a bar code corresponding to numbers of said zip code and comprising:
   a case having a power supply, a bar code printing module, a display module, a keypad module, and controller means for communicating with and controlling said modules in accordance with a set of instructions;
   said keypad module comprising a power switch means for selectively energizing said device, key means for entering numbers of said zip code into said device selectively, and means for initiating printing of said bar code;
   said display module having means for displaying each number of said zip code as said numbers are entered into the device via said key means;
   said printing module having means for printing said bar code upon actuation of said printing initiating means;
   said case having means for receiving envelopes and labels, individually and interchangeably, as said articles of mail and for guiding said articles to a print station, and means for locating a specific portion of each of said articles in relation to said printing means so as to ensure that said bar coded zip code is printed on said specific portion of each said article; and
   means for automatically printing a bar coded zero for each number of said zip code which is not entered into said device by a user.

* * * * *